J. M. THATCHER.

Hot Air Furnace.

No. 327. Reissued Sept. 11, 1855.

N. PETERS, Photo-Lithographer, Washington, D. C.

UNITED STATES PATENT OFFICE.

J. M. THATCHER, OF JERSEY CITY, NEW JERSEY.

IMPROVEMENT IN AIR-HEATING STOVES.

Specification forming part of Letters Patent No. 8,832, dated March 23, 1852; Reissue No. 327, dated September 11, 1855.

*To all whom it may concern:*

Be it known that I, J. M. THATCHER, of Jersey City, county of Bergen, and State of New Jersey, have invented certain new and useful Improvements in Air-Heating Stoves and Furnaces; and I do hereby declare that the following is a full, clear, and exact description of the same, reference being had to the accompanying drawings, forming part of this specification, in which—

Figure 1:
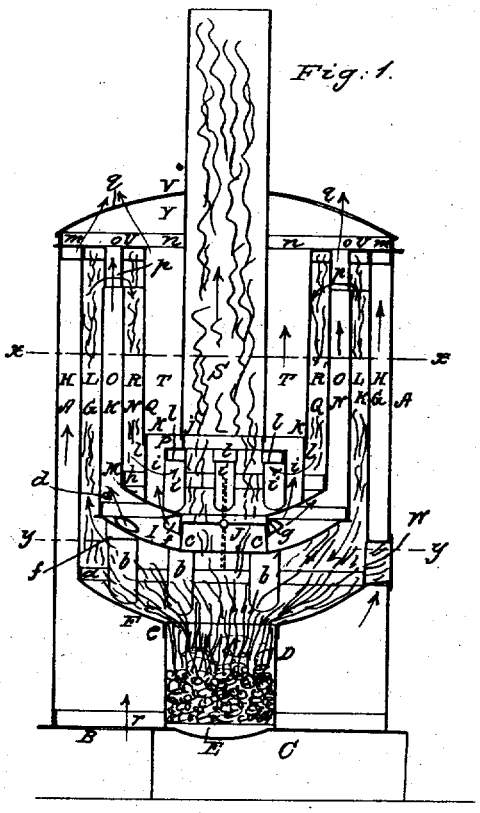
Figure 3:
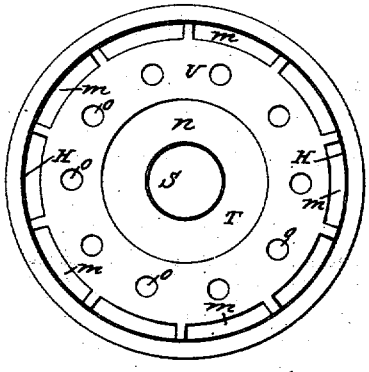
Figure 4:
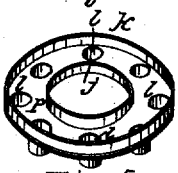
Figure 5:
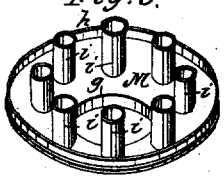
Figure 2:
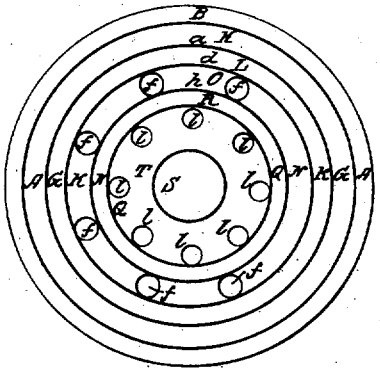
Figure 6:
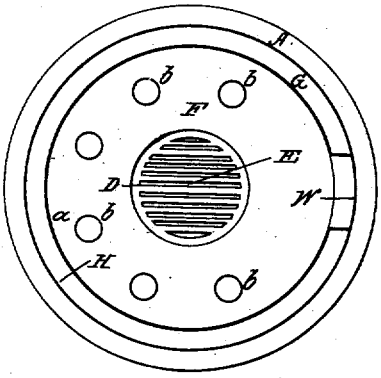

Figure 1 is a vertical section of one of my improved stoves, taken through the center. Fig. 2 is a horizontal section of the same, taken in the line *x x* shown in Fig. 1. Fig. 3 is a plan or top view of the same having the cap removed. Figs. 4 and 5 are detached views of parts of the interior. Fig. 6 is a horizontal section taken through the line *y y* shown in Fig. 1.

Similar letters of reference indicate corresponding parts in each of the several figures.

In air-heating stoves and furnaces for warming apartments and buildings, and for other purposes, it is highly important to have the products of combustion from the fire-chamber inside pass among and around the air tubes or passages to increase the extent of heating-surface; and to effect this economically and advantageously it has been deemed important so to arrange the air-passages and flue-spaces that the products of combustion should pass from the central or internal fire-chamber outward, and then, if required, inward to the exit-pipe, while the air is carried in a general direction upward; but to effect this in a practical way has been attended with serious difficulties. The plates or rings forming the flue-spaces for the passage of the products of combustion outward or inward have prior to my invention been made flat and horizontal, or nearly so, and as in all stoves and furnaces having a good draft great quantities of ashes and other solid particles of matter are carried up from the fire-chamber by the force of the current, these, together with the soot, lodge upon these plates, and in a short time obstruct the draft, and by reason of their bad conducting properties prevent the heating of the plates, and, as a necessary consequence, the air coming in contact with their opposite surfaces.

The leading object of my said invention was to avoid the difficulties above enumerated; and to these ends my said invention consists in giving to the plate or plates which form the bottom of the flue space or spaces for the passage of the products of combustion outward or inward, around or among the passages for the air to be heated, an inclination inward and downward toward the fire-chamber, so that all particles of ashes, soot, or other solid matter falling upon such plate or plates may be returned by gravity into the fire-chamber, and thus keep the flues clear for draft, and also the surface of the plate or plates for the transmission of heat to the air-passages; and my said invention also consists in the employment of a series of hollow cylinders or tubes, of any suitable form, arranged one within another above the fire-box and around the chimney, with a space all round between every two of them, certain of such spaces being connected at the top and bottom to form flues leading from the fire to the chimney, and the intermediate spaces between the first-named spaces forming air-passages through which, and through smaller tubes passing through the flues, the air passes to be heated. The connections between the several spaces are formed in such a manner as to cause the draft and ignited gases from the fire to ascend and descend through the spaces forming the flues, and circulate through them all before reaching the chimney, and also to allow the air to pass directly upward to the intermediate spaces and small tubes to the chamber above them, from which it is distributed. Certain contrivances are provided for the purposes of controlling the circulation or distribution of the air through the several spaces or passages through which it passes according to the degree of intensity of the heat at different points, so as to induce the greatest flow through those parts where the heat is most intense.

To enable others skilled in the art to make and use my invention, I will proceed to describe fully its construction and operation.

A is the outer casing of the stove, which consists of a cylinder of sheet metal. It is set upon a cast-iron base-plate, B, below which is the ash-pit C.

D is the fire-box, which rests upon the plate B.

E is the grate.

F is an inverted circular dome of cast-iron, having an opening through its center, surrounded by a rim, *e*, which fits to the top of the fire-box, and having also another rim, *a*, which stands up from its outer edge. It has a number of small tubes, *b b*, standing up from it, ranging in a circle around the fire-box. Its form may be best understood by reference to Fig. 5, which represents a similar dome, hereinafter to be referred to.

G is a sheet-iron cylinder fitting close over the rim *a*, and being supported by the dome F, the space between it and the outer casing, A, forming an annular passage, H. It reaches to the same height as A.

I is an inverted dome of cast-iron, smaller than F. It has an opening through its center, surrounded by a rim, *c*, which extends upward in the form of a slightly conical tube, and has another rim, *d*, extending upward around its outer edge. It has a series of short tubes, *f f*, extending downward from it, which fit over the tubes *b b* of the dome F, and form passages through both domes, the tubes *b b* supporting the upper dome.

J is a damper or valve, which is placed in the short tube *c*.

K is a sheet-iron cylinder fitting over the rim *d*, and, being supported by the dome, it does not extend quite so high as G. The space between it and G forms an annular passage, L.

M is an inverted dome similar to F, and represented detached in Fig. 5. It has an opening in its center surrounded by a rim, *g*, which fits over the short pipe *c*, on which it is supported. It has a rim, *h*, which extends upward all round it, and a series of tubes, *i i*, extending upward, ranging in a circle around its center.

N is a sheet-iron cylinder fitting on the rim *h*, and supported by the dome M. It extends upward to the same height as the cylinder K, and there is an annular space, O, between the two.

P, whose form is most clearly shown in Fig. 4, is a circular plate of cast-iron, having an opening through its center surrounded by a rim, *j*, forming the chimney-seat. It has a rim, *k*, extending upward around its outer edge, and has a number of short tubes, *l l*, extending downward and fitting over the tubes *i i*, forming passages through it and through the dome.

Q is a sheet-iron cylinder fitting and resting on the plate P, and running up to the same height as the cylinders A and G. The space between it and N forms an annular passage, R.

S is the chimney. Between it and the cylinder Q is an annular space, T.

U is a cast-iron plate whose form is shown in plan, Fig. 3. It fits down close to the cylinders A, G, and Q, and has openings *m m*, communicating with H, an opening, *n*, which communicates with T, and a series of openings, *o o*, which communicate, by a series of small tubes, *p p*, with the space O, the top of the said space O being covered and closed by a ring of metal, so as to close all outlets except through the said tubes *o o*.

V is the cover of the stove, which fits to the outer casing, A, or to the plate U. It is of dome shape and raised sufficiently above the plate U to form a receiving and distributing chamber, Y, for the heated air, the chimney S passing through it. It is provided with openings *q q*, through which the air is distributed.

W is the fire-door, through which fuel is introduced to the fire-box.

*r*, Fig. 1, represents one of a series of openings in the plate B, around the foot of the fire-box, through which the air is admitted to be heated.

It will be understood by reference to Fig. 1 that when the damper J is closed the draft from the fire plays between the tubes *b b*, ascends the annular flue L, and then passes between the tubes *p p*, descends the annular flue R, and, after passing between the tubes *i i*, ascends the chimney S, its course throughout being indicated by arrows in the flues.

The air to be heated is supplied through the openings *r* in the base-plate, rising up to the inverted dome F, which spreads it, and part of it ascends the outer passage, H, and passes through the openings *m m* to the chamber Y, while the other ascends the tubes *b b f f* to the space between the inverted domes I and M, where it is again divided, part of it passing up the passage O, and through the tubes *o o* to the chamber Y, and the remainder through the tubes *i i* and passage T to the said chamber, from which it passes off to the openings *q* for use, its ascent being shown by arrows in the passages. During its ascent it is brought into contact with an immense amount of heating-surface, being divided in passing through the main passages H O T into thin currents, each of which, except the outermost one, passes between two surfaces which are exposed to the fire, and being divided by passing through the small tubes into still smaller currents, each of which is entirely surrounded by the heat and ignited gases passing through the flues, a great amount of heat is also communicated to it in passing the inverted domes. As the under part of the flue-spaces through which the products of combustion pass outward and inward, and herein termed the "domes," are inclined downward toward the center of the stove or furnace or fire-chamber, it will be seen that all solid particles of matter—such as ashes, soot, &c., falling upon these surfaces, will roll down and be returned to the fire-chamber—and it will be obvious that this will be the case whether the air-passages be arranged in the manner herein described or in any other manner, with the view to obtain an extended heating-surface, and hence I wish it to be distinctly understood that I do not limit myself to the use of the two parts of my invention in connection, although in my belief the best results will be obtained by the union of the two.

The above-described arrangement of cylinders may be continued with an increased number similarly connected to form a greater number of air passages and flues if thought desirable. As many may be employed as will reduce the temperature in the chimney so much that no advantage could be gained by further increase. Instead of cylinders, tubes of polygonal, elliptic, or other forms may be employed, and instead of domes F I M P frustums of cones may be used. As the heat will have the greatest degree of intensity near the center of the stove, it is advantageous to induce a stronger current of air through those passages nearest it than through those nearest the outside. This I accomplish by the following means: By making the sum of the areas of the tubes *b b f f* greater than that of the openings *m m* at the top of the passage H, and the sum of the areas of the passages O T much greater than that of H, I induce a strong current through *b b f f*, where the heat is extremely intense, which weakens that in H and sends more air into the space above the dome I. Again, by making the sum of the areas of the tubes *i i* greater than that of the tubes *p p* or of the openings *o o*, and the areas of T greater than that of *o*, I induce a strong current through *i i*, which weakens that through *o* and strengthens that in T. Thus the air has tendency to rush in stronger currents toward the center of the stove.

What I claim as my invention, and desire to secure by Letters Patent, is—

1. Making the bottom plates of the flue-spaces of air-heating furnaces or stoves for the passage of the products of combustion outward or inward among or around the air-passages inclining inward and downward toward the fire-chamber, substantially as described, for the purpose of facilitating the increase of the heating-surface without the inconvenience of the accumulation of ashes, soot, and other solid matter on such plates, as set forth.

2. The combination of the inverted domes or frustums F I M and plate P with the short tubes *b b*, *f f*, *i i*, *l l*, connecting them, substantially in the manner herein described, for the purpose of effecting the connection between the lower ends of the fire or draft flues and carrying the air through them to the spaces between the cylinders or tubes.

J. M. THATCHER.

Witnesses:
WM. H. BISHOP,
ANDREW DE LACY.